United States Patent [19]

Patel

[11] Patent Number: 5,479,174
[45] Date of Patent: Dec. 26, 1995

[54] TRITIUM PRIMED QUARTZ IGNITOR FOR RADAR RECEIVER PROTECTOR

[75] Inventor: Sumantrai D. Patel, Silver Spring, Md.

[73] Assignee: Westinghouse Electric Corporation, Pittsburgh, Pa.

[21] Appl. No.: 161,632

[22] Filed: Dec. 6, 1993

[51] Int. Cl.$^6$ ........................................ H01P 1/14
[52] U.S. Cl. ............................................... 342/198
[58] Field of Search .................... 342/198; 333/13; 315/39

[56] References Cited

U.S. PATENT DOCUMENTS 3,705,319  12/1972  Goldie et al. ..................... 333/13
4,963,842  10/1990  Patel ................................ 333/13

*Primary Examiner*—Daniel T. Pihulic

[57] ABSTRACT

A device for use as a receiver protector in radar systems comprising a passive gas stage device and a waveguide opening. The passive gas stage device includes a sealed quartz container, a reactive gas filling the container and a thin film of radioactive material deposited on a flat surface of a glass rod in the interior quartz container for providing free electrons to initiate a gas discharge in the presence of high power pulses. The waveguide opening includes an iris plate having a discharge gap that is in close proximity to the film of radioactive material so that the film provides a large number of electrons in the discharge gap to initiate a gas discharge in the presence of microwave pulses.

11 Claims, 3 Drawing Sheets

TRITIUM PRIMED QUARTZ IGNITOR FOR RADAR RECEIVER PROTECTOR

BACKGROUND OF THE INVENTION

1. Field of the Invention

The present invention relates generally to receiver protectors, and more particularly to a device for use as a receiver protector in radar systems.

2. Discussion of the Related Art

Receiver protectors in radar systems operate to limit the amount of power reflected toward the receiver from the radar antenna during the time the transmitter is sending out high power signals. When the transmitter ceases to transmit energy pulses, an echo from the target is received by the antenna and passes through the receiver protector. Waveguide receiver protectors operate at various frequency ranges, depending on the size of the waveguides. A conventional receiver protector may consist of a sealed quartz capsule containing a halogen gas, which is located adjacent to an iris plate in the waveguide. A high energy microwave pulse of a predetermined threshold level ionizes the gas in the capsule and causes the high energy pulse to be reflected.

A conventional low threshold receiver protector is comprised of an rf oscillator, a coupling circuit, a high Q microwave cavity and an auxiliary "keep alive" or discharge gap. The "keep alive" or discharge gap provides a constant supply of free electrons to achieve breakdown of gas at low microwave power and a fast recovery time of about 200 nanoseconds to protect the receiver. Fast recovery time performance is desired to detect close range targets by the receiver. The low power oscillator in a conventional receiver protector transmits rf energy into a microwave cavity to create a continuous gas discharge in an auxiliary gap. The electrons from the auxiliary discharge gap drift into the main waveguide discharge gap to provide the seeding necessary to initiate a gas discharge or breakdown in the presence of high power rf pulses. The presence of gas discharge causes a short circuit in the waveguide, therefore, reflecting most of the incident power and acts as a protector.

The tuning, testing and fabrication of such a conventional device is complex. For example, to create the auxiliary discharge, the fixed frequency oscillator needs to be tracked with the cavity frequency when the temperature varies from −40° C. to 70° C. The oscillator, the coupling circuit and the cavity add to the material cost of the main waveguide capillary stage. In addition, such low threshold devices require an external power source to operate the oscillator.

Receiver protectors have been developed which do not require an external power source in order to breakdown the gas. Such receiver protectors are referred to as passive receiver protectors. To achieve a fast recovery time, however, these prior art passive gas stage receiver protectors utilize nickel substrates with radioactive tritium film. The tritium radioactive film on the nickel substrate served to provide a source of free electrons to initiate the breakdown of the gas. To achieve fast recovery time performance, however, $H_2O$ vapor, as well as heaters to enable the $H_2O$ vapors to perform at temperatures below 0° C. was used.

Chlorine gas is known to be highly reactive. As such, chlorine has high affinity for electrons; therefore, it attaches to electrons in gas discharge rapidly. This results in a fast recovery time performance.

Conventional passive chlorine gas stage receiver protectors use a radioactive promethium priming of about 5 microcurie strength. A liquid promethium compound is evaporated on the inside of a quartz tube and supplies free electrons for initiating the gas discharge. Due to the weak radioactive strength of the promethium and the low Q of this receiver protector, however, this chlorine gas stage receiver protector has a high firing threshold. A low firing threshold is important in order to achieve low spike and flat leakages at the output of the device. To achieve a low firing threshold of less than 20 Watts, however, a strong radioactive source is needed to utilize the fast recovery time performance provided by a chlorine gas stage receiver protector. A typical titanium titride film of 100 millicurie emits sufficient free electrons to breakdown chlorine gas under 20 Watts of microwave power. The technology of depositing titanium titride film on nickel substrates or rods is well known. However, nickel is reactive to chlorine gas and the use thereof results in gas clean-up and greatly reduces the lifetime of the receiver protector. In light of the foregoing, there is a need for a low cost, less complex, low threshold receiver protector which provides for a fast recovery time and low leakages.

SUMMARY OF THE INVENTION

Accordingly, the present invention is directed to a device for use as a receiver protector in radar devices that substantially obviates one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the device particularly pointed out in the written description and claims hereof as well as the appended drawings.

To achieve these and other advantages and in accordance with the purpose of the invention, as embodied and broadly described herein, the invention includes a device for use as a receiver protector in radar systems wherein the device includes a passive gas stage device and a waveguide opening. The passive gas stage device of the present invention includes a sealed quartz container. A reactive gas fills the container, and a quartz rod containing a film of radioactive material is positioned in the container for providing free electrons to initiate a gas discharge in the presence of high power pulses. The waveguide opening includes a metal iris plate having a discharge gap that is in close proximity to the film of radioactive material so that the film provides a large number of electrons (emissions from radioactive source) into the discharge gap to initiate a gas discharge in the presence of microwave pulses.

In another aspect, the invention is a passive gas stage device for use in a receiver protector that comprises a sealed quartz container; a quartz rod within said container, said rod having at one end a surface with a perimeter and at an opposite end a cap with a perimeter larger than the perimeter of said surface; a radioactive film on said surface of the rod; and a reactive gas filling said container, said gas being capable of ionization in response to a microwave pulse for fast recovery time performance.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

DETAILED DESCRIPTION OF THE PREFERRED EMBODIMENTS

Figure 1:
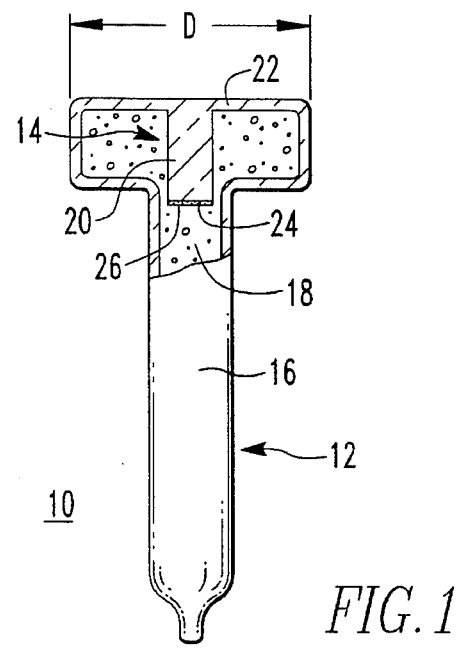
FIG. 1 is a partial cross-sectional view of a passive gas stage of one embodiment of the present invention illustrating a quartz container and substrate.

Reference will now be made in detail to the present preferred embodiment of the invention, examples of which are illustrated in the accompanying drawings.

The device for use as a receiver protector includes a passive gas stage device and a waveguide opening. In accordance with the invention, the passive gas stage device includes a sealed quartz container, a quartz rod containing a radioactive film and a reactive gas filling the container to provide a fast recovery time. The exemplary embodiment of the passive gas stage device of the present invention is shown in FIG. 1 and is designated generally by reference numeral 10.

Referring to FIG. 1, the passive gas stage device for use in a receiver protector includes a sealed quartz container 12. The sealed quartz container 12 includes a quartz substrate 14 and a quartz vial body 16. As embodied herein and depicted in FIG. 1 and FIGS. 2A, and 2B the circular quartz substrate 14 consists of a circular quartz rod 20 having a diameter d with thin circular cap 22 of a relatively large diameter D. The perimeter of the cap 22 is larger than the perimeter of the rod 20. It is preferred that the diameter d of the circular quartz rod 20 is in the range of about 0.05 to 0.5 inches.

Figure 2A:
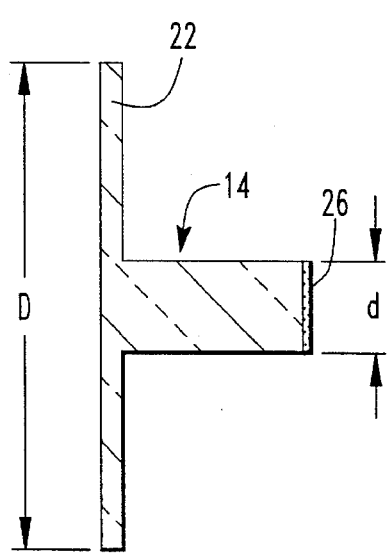
FIG. 2A is a cross-sectional view of the quartz rod or substrate taken along line 2A—2B of FIG. 2B.
Figure 2B:
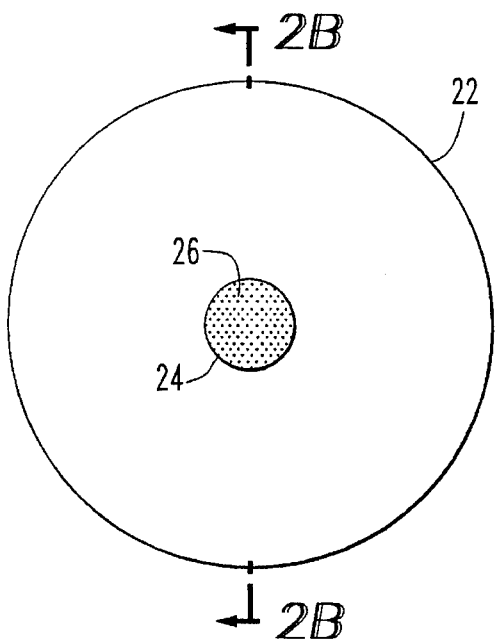
FIG. 2B is an end view of the quartz container illustrating the quartz substrate cap of FIG. 1.

In accordance with the invention, the passive gas stage device includes a film of radioactive material positioned on an interior surface of the sealed quartz container for providing free electrons to initiate a gas discharge in the presence of high power microwave pulses. As embodied herein and depicted in FIG. 2B, the circular quartz rod 20 of the substrate 14 contains a flat circular surface 24 to provide the means for placing radioactive film 26 thereon inside the quartz vial body 16 at the required location. As embodied herein, the diameter d of the circular quartz rod 20 in FIG. 2A is adjusted to utilize a radioactive film 26 which provides a minimum radioactivity of at least 100 millicurie.

It is preferred that the radioactive film 26 is formed by depositing a thin layer of material on the flat circular surface 24 of the circular quartz rod 20 by electron beam vapor, deposition and absorbing radioactive gas into the layer of material. It is also preferred that the radioactive film 26 is titanium titride film. As herein embodied, the titanium titride film 26 is formed by depositing a thin layer of titanium on the flat surface 24 by electron beam vapor deposition and absorbing radioactive tritium gas into the titanium layer. Preferably, the radioactive film 26 has a thickness in the range of about 5 through 8 microinches. In the preferred embodiment, the titanium titride film 26 has a thickness of about 6.0 microinches.

In accordance with the invention, the passive gas stage device includes a reactive gas filling the sealed quartz container. As herein embodied and referring back to FIG. 1, the sealed quartz container 12 is formed by fusing the circular quartz substrate 14 to the quartz vial body 16 to achieve an all quartz vacuum-tight sealing. The wall of the quartz vial body 16 shown in FIG. 1 is thin, approximately 0.010–0.020 inches. The sealed quartz container 12 is evacuated and backfilled with a reactive gas 18. It is preferred that the reactive gas 18 is selected from the group consisting of a mixture of low pressure chlorine, chlorine-oxygen, and chlorine-oxygen-argon gases. It is also preferred that the pressure of the reactive gas 18 is about 10 to 20 torr. The present invention is applicable to reactive or non-reactive gas filled stages. The non-reactive gases are typically the noble gases like argon, krypton, helium, xenon, neon, etc. For example, in a preferred embodiment, a mixture of 8 torr chlorine, 8 torr oxygen and a trace (i.e. 0.5 to 1.0 torr) of argon is backfilled in the sealed quartz container 12.

In the presence of a microwave pulse, the reactive gas mixture 18 is ionized by the process of multiple collisions of gas molecules with the free electrons provided by the radioactive film 26. It is preferred that the strength of the radioactive film 26 is such that gas breakdown occurs below about 20 watts of microwave pulsed power. A fast recovery time under 300 nanoseconds is achieved with a typical 2 Kw of incident pulsed microwave power levels. The radioactive hydrogen in the titanium titride film 26 is extremely stable and does not form HCl or an equivalent compound in the reactive chlorine gas filled environment 18 unless the temperature is raised to about 300° C. At this temperature, most of the hydrogen is depleted from the film and the chlorine gas is mixed with radioactive hydrogen. A long lifetime of about 20 years is expected for the radioactive titanium titride film 26 in pure chlorine gas filled environments 18.

Figure 3:
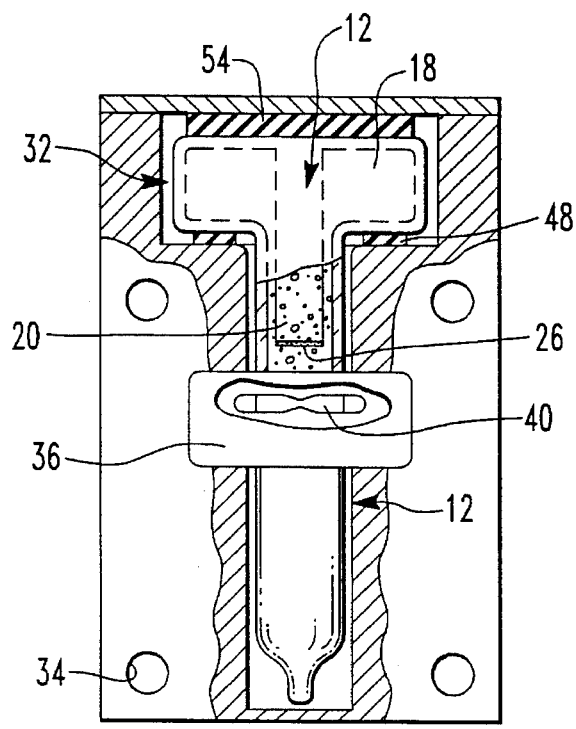
FIG. 3 is a front view partly in cross-section of the passive gas stage device of FIG. 1 positioned in a waveguide mount.
Figure 4:
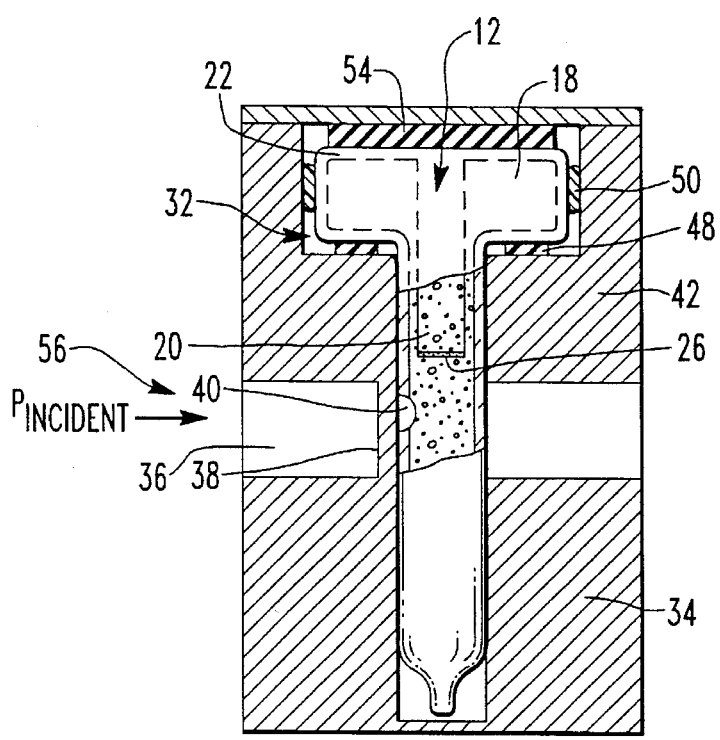
FIG. 4 is a side view partly in cross-section of the device of FIG. 3.

An embodiment of the passive gas stage device of the present invention positioned in a waveguide mount is shown in FIGS. 3 and 4 and is designated generally by reference numeral 30. As embodied herein and referring to FIG. 3, the passive gas stage device positioned in a waveguide mount for use in radar receiver protectors includes a sealed quartz container, a reactive gas filling the container, a film of radioactive material positioned on an interior surface of the container, and a waveguide opening. In accordance with the invention, the waveguide opening includes an iris plate having a discharge gap that is in close proximity to the film of radioactive material so that the film provides a large number of electrons in the discharge gap to initiate a gas discharge in the presence of a microwave pulse.

As embodied herein and depicted in FIG. 3, the sealed quartz container 12 has a gas reservoir 32 at the top to store a sufficient quantity of reactive gas 18 to meet the lifetime requirements of the passive gas stage device 30. The term "gas reservoir" 32 is used to define the upper portion of the sealed quartz container 12.

Figure 6:
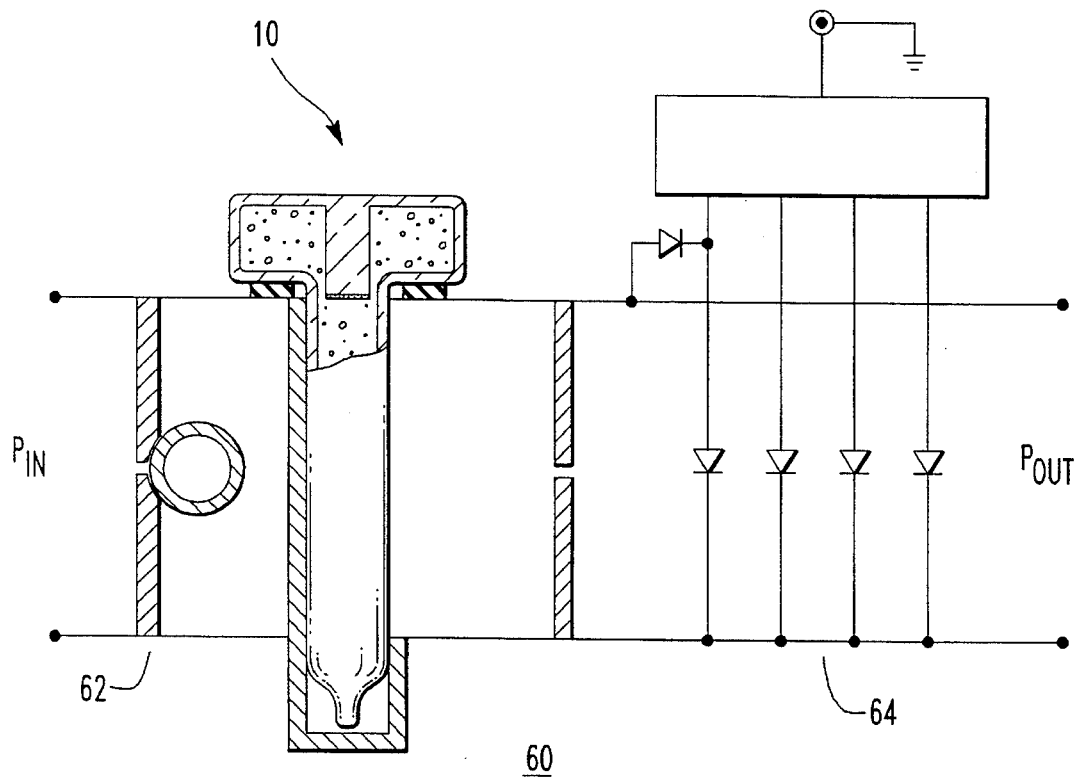
FIG. 6 is a schematic drawing of a multistage X-band gas/diode receiver protector containing the passive gas stage device of the present invention.

The purpose of the waveguide mount 34 is to accommodate the sealed quartz container 12 in a vertical position. The waveguide mount 34 shown in FIGS. 3, 4 and 6 is an X-band waveguide but the invention is applicable to other waveguide bands as well, such as L-bands to Ka-bands.

Figure 5:
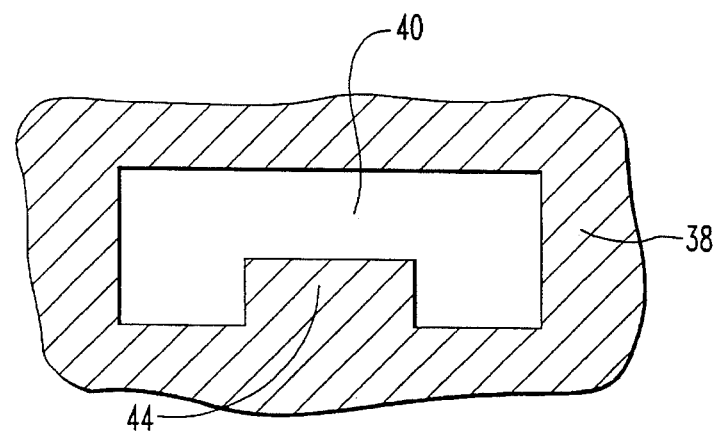
FIG. 5 is an enlarged front view of the iris plate of FIGS. 3 and 4.

In accordance with the invention, the device for use as a receiver protector includes a waveguide opening which includes an iris plate. As herein embodied and referring to FIG. 5, the iris plate 38 which consists of a single strip electrode 44 of approximately 0.050 inch width and a 0.010 inch discharge gap 40 to achieve firing thresholds below 20 W peak. A rectangular iris plate 38 is preferred but other shapes are contemplated for use in the invention. For example, dumbbell or circular iris plates can be employed.

As embodied herein and depicted in FIG. 3, a waveguide opening 36 has been cut into the waveguide mount 34. As herein embodied, the waveguide opening 36 includes an iris plate 38. Referring to the side view of the waveguide mount 34 in FIG. 4, the waveguide mount 34 has a rectangular waveguide opening 36 in the center position of the mount 34 along the entire length of the mount 34 except at the iris plate 38. The purpose of the iris plate 38 is to create a narrow discharge gap iris 40 in the rectangular waveguide opening 36. As embodied herein, a portion of the waveguide opening 36 is positioned between the thin radioactive film 26 and the iris plate 38 to shield the thin film 26 from high power microwave pulses.

As shown in FIG. 3, the circular quartz rod 20 within the sealed quartz container 12 is located vertically so as to keep the radioactive film 26 in close proximity to the discharge gap 40 in the waveguide iris plate 38 and to provide the maximum number of electrons into the discharge gap 40 to initiate the gas discharge in the presence of high power rf pulses. The radioactive film 26 is not affected by the gas discharge since it is positioned within the top wall 42 of the waveguide opening 36 where electric fields are nonexistent.

As embodied herein and referring to FIG. 4, the sealed quartz container 12 is inserted adjacent to, and in direct contact with, the iris plate 38. The iris plate 38 shown in the rectangular waveguide opening 36 of FIG. 4 is positioned to meet two conditions. First, it is preferred that the top edge of the iris 38 is in close proximity to the radioactive film 26 in order to provide a sufficient amount of free electrons in the quartz tube region 46 adjacent to the iris plate 38. Secondly, it is preferred that the radioactive film 26 is inside the top wall 42 of the waveguide opening 36. A rubber gasket 48 or O-ring is placed between the gas reservoir 32 and the top wall 42 of the waveguide opening 36 to cushion the sealed quartz container 12 and the waveguide mount 34. The sealed quartz container 12 shown in FIG. 4 is mechanically held into the waveguide mount 34 by a dielectric epoxy 50.

As shown in FIG. 4, a metal cover plate 52 with a cushion pad 54 can be installed on the waveguide mount 34 on top of the gas reservoir 32 to protect the sealed quartz container 12. As embodied herein, the vertical circular hole diameter which has been cut into the waveguide mount 34 and the diameter of the circular cap 22 is preferably less than a fourth of the waveguide wavelength. Such dimensions are computed so as to prevent the radiation of microwave energy from the waveguide opening 36 back into the vertical sealed quartz container 12. As shown in FIG. 4, the gas breakdown or discharge occurs inside the sealed quartz container 12 adjacent to the iris plate 38. The gas discharge gap 40 in the region of the iris 38 electrically shorts the waveguide opening 36 and reflects a major portion of the microwave energy towards the incident port, $P_{incident}$, 56 as shown in FIG. 4. This results in an incident power attenuation of about 20 to 30 dB at the device output and serves as a protector.

A multistage X-band gas/diode receiver protector using the passive gas stage device of the present invention is depicted in FIG. 6 and is designated generally by reference numeral 60. The multistage X-band gas/diode receiver protector 60 has a high threshold chlorine vial stage 62, the disclosed passive gas stage device 10 and a quasi-actively biased low power solid state limiter stage 64. The spike leakage, flat leakage and 1-dB recovery time under 100 mW, 50 mW and 250 nanoseconds respectively are achievable with 2 kW peak continuous rf pulsed power with a gated or ungated solid state limiter. The instantaneous rf power handling of this multistage X-band gas/diode receiver protector 60 is estimated to be about 20 kW peak.

It will be apparent to those skilled in the art that various modifications and variations can be made in the device of the present invention without departing from the spirit or scope of the invention. Thus, it is intended that the present invention cover the modifications and variations of this invention provided they come within the scope of the appended claims and their equivalents.

I claim:

1. A passive gas stage device for use in a receiver protector in radar systems comprising:

a sealed quartz container;

a quartz rod within said container, said rod having at one end a surface with a perimeter and at an opposite end a cap with a perimeter larger than the perimeter of said surface;

a radioactive film on said surface of the rod; and a reactive gas filling said container, said gas being capable of ionization in response to a microwave pulse for fast recovery time performance.

2. The passive gas stage device of claim 1 wherein the radioactive film comprises a layer of titanium with radioactive tritium gas absorbed in said layer.

3. The passive gas stage device of claim 2 wherein the surface of the rod is substantially flat; and said radioactive film is formed by depositing a thin layer of titanium on said flat surface by electron beam vapor deposition and absorbing radioactive tritium gas into said titanium layer.

4. The passive gas stage device of claim 2 wherein the layer of titanium has a thickness in the range of about 5 to 8 microinches.

5. The passive gas stage device of claim 2 wherein the layer of titanium has a thickness of about 6.0 microinches.

6. The passive gas stage device of claim 1 wherein the reactive gas is capable of ionization by microwave pulses having a power level of approximately 20 Watts peak.

7. The passive gas stage device of claim 1 wherein the quartz rod is circular in cross section.

8. The passive gas stage device of claim 7 wherein the circular quartz rod has a diameter in the range of about 0.05 to 0.5 inches.

9. The passive gas stage device of claim 1 wherein the reactive gas is selected from the group consisting of low pressure chlorine, chlorine-oxygen, and chlorine-oxygen-argon mixtures.

10. The passive gas stage device of claim 9 wherein the reactive gas is maintained at a low pressure of about 10 Torr.

11. The passive gas stage device of claim 2 wherein the radioactive film has radioactivity in the range of about 100–150 millicurie.

\* \* \* \* \*